United States Patent
Lemaire et al.

(10) Patent No.: US 8,931,899 B2
(45) Date of Patent: Jan. 13, 2015

(54) METHOD FOR TRIMMING AN OPTHALMIC LENS

(75) Inventors: Cedric Lemaire, Charenton le Pont (FR); Sebastien Pinault, Charenton le Pont (FR)

(73) Assignee: Essilor International (Compagnie Generale d'Optique), Charenton le Pont (FR)

(*) Notice: Subject to any disclaimer, the term of this patent is extended or adjusted under 35 U.S.C. 154(b) by 0 days.

(21) Appl. No.: 14/347,204

(22) PCT Filed: Aug. 29, 2012

(86) PCT No.: PCT/FR2012/000343
§ 371 (c)(1),
(2), (4) Date: Mar. 25, 2014

(87) PCT Pub. No.: WO2013/045769
PCT Pub. Date: Apr. 4, 2013

(65) Prior Publication Data
US 2014/0300858 A1    Oct. 9, 2014

(30) Foreign Application Priority Data
Sep. 26, 2011 (FR) .................. 11 02911

(51) Int. Cl.
*G02C 3/00* (2006.01)
*G02C 7/00* (2006.01)
*G02C 7/02* (2006.01)
*B24B 49/16* (2006.01)

(52) U.S. Cl.
CPC .. *B24B 49/16* (2013.01); *G02C 7/02* (2013.01)
USPC .................................... 351/159.73

(58) Field of Classification Search
CPC ............ G02C 7/024; G02C 7/02; G02C 1/10; B24B 9/14; B24B 47/225; B24B 9/146
USPC ......... 351/159.01, 159.73, 246; 264/1.1, 1.32
See application file for complete search history.

(56) References Cited

U.S. PATENT DOCUMENTS

| 2004/0019170 A1* | 1/2004 | Ohrui et al. ................ 526/329.7 |
| 2004/0192170 A1 | 9/2004 | Mizun |

FOREIGN PATENT DOCUMENTS

FR    2 894 170    6/2007

OTHER PUBLICATIONS

International Search Report, dated Oct. 17, 2012, from corresponding PCT application.

* cited by examiner

*Primary Examiner* — James Greece
(74) *Attorney, Agent, or Firm* — Young & Thompson

(57) ABSTRACT

A method for trimming an ophthalmic lens using a machining device having a load sensor for measuring a load relating to the load applied by a machine tool to the lens, includes: immobilizing the lens on an immobilizing element, and trimming the lens, while measuring the load magnitude and steering the machine tool relative to the immobilizing element so as to bring the initial contour of the ophthalmic lens to a final contour of a different shape. Between the immobilizing and trimming steps, the machine tool is steered relative to the immobilizing element so that it makes a tour around the lens without contact therewith, while measuring the unladen load magnitude, this relating to the load required to move the machine tool relative to the immobilizing element without performing machining work while steering the machine tool, during the trimming step, as a function of the unladen magnitude measured.

15 Claims, 1 Drawing Sheet

METHOD FOR TRIMMING AN OPTHALMIC LENS

TECHNICAL FIELD OF THE INVENTION

Generally, the present invention relates to the preparation of blank ophthalmic lenses with a view to fitting them into spectacle frames.

This invention applies to machining devices comprising:
- a means for clamping the ophthalmic lens;
- a tool for machining the ophthalmic lens;
- a force sensor adapted to measure a machining force related to the force applied by the machining tool to the ophthalmic lens; and
- a unit for controlling said machining tool relative to said clamping means.

It also more particularly relates to a process for shaping an ophthalmic lens, comprising:
- a step of clamping the ophthalmic lens in said clamping means; and
- a step of shaping the ophthalmic lens using said machining tool, in which step the loaded value of said machining force is measured and said machining tool is controlled, relative to said clamping means so as to bring the initial outline of the ophthalmic lens to a final outline of different shape, depending on the measured loaded value.

PRIOR ART

During the shaping of an ophthalmic lens, it proves to be necessary to determine the force applied by the machining tool to the ophthalmic lens in order, in particular, to ensure that this force remains constantly below a threshold above which the lens could run the risk of slipping from its clamping means, or above which the tool could be damaged. It is also known to use this force to control the machining device with greater acuity.

One of the solutions for determining this machining force consists in measuring the instantaneous value of the rotation speed of the tool, in measuring the instantaneous value of the electrical power delivered to the tool, and in deducing the machining force from the ratio of these two values.

Unfortunately, when the material of the lens melts in proximity with the machining tool, this solution becomes very imprecise.

Another known solution for determining the machining force consists in using a force sensor such as a strain gauge.

The major drawback of this solution is that, in practice, it proves to be quite imprecise.

Specifically, a notable divergence is observed between the force measured by the strain gauge and the force actually applied by the tool to the lens, which may thus reach more than 10 newtons. This divergence is in particular due to resistive forces generated by friction between the various moving parts of the machining device. Moreover, it is observed that this divergence varies during the machining of the lens.

During this machining, it is thus necessary to ensure that the measured force remains at least 15 newtons below the aforementioned threshold, so that the actual machining force remains below this threshold.

Because of this lack of precision in the measurements, it is moreover not possible to draw other conclusions from the measured values, relating, for example, to wear of the machining tool.

SUBJECT OF THE INVENTION

In order to remedy the aforementioned drawbacks of the prior art, the present invention proposes to process the measured values in order to remove parasitic components therefrom.

More particularly, the invention provides a shaping process such as defined in the introduction, in which provision is made, between said clamping step and said shaping step, for at least one intermediate step in which said machining tool is controlled, relative to said clamping means, so as to travel the circumference of said ophthalmic lens, without contact, following a path deduced from said initial outline, and in which the unloaded value of the machining force is measured, and in which provision is made, in the shaping step, for said machining tool to be controlled depending on the unloaded value of the machining force.

In the intermediate step, the machining tool is therefore controlled in order to pass, in free space, around the lens clamped beforehand in the supporting means, under conditions similar to those that will be encountered in the shaping step.

Thus, this intermediate step allows, because it enables the unloaded value of the machining force to be noted, variations in the frictional forces acting on the elements of the device as the machining tool passes around the lens to be determined.

This measurement is especially carried out once the lens has been clamped in the clamping means, so that the clamping force applied to the lens, the weight of the lens, etc., are taken into account.

It is moreover carried out while following the initial outline of the lens, so that it is performed under conditions that are very similar to those that the tool will encounter in the shaping step.

It is then possible to subtract this unloaded value from the measured loaded value, in order to obtain a very close approximation to the force that is actually exerted, by the machining tool, on the lens.

By virtue of this approximation, it is possible to control the machining tool such that it exerts, on the lens, a force close to the allowable threshold, increasing the quality of the machining operation and the rapidity of the execution of this machining operation.

It is also possible to deduce therefrom an approximation of the wear of the machining tool, provision being made, if necessary, to alert the optician if the degree of wear exceeds an allowable value.

It is also possible to detect a fault or a problem during the machining of a lens, such as for example an error in the entry of the material of the lens to be shaped, provision being made, if necessary, to alert the optician.

It is also possible, using the values measured, to analyze variations in the friction measured, in order to continuously calibrate the machining device.

The following are other advantageous and nonlimiting features of the shaping process according to the invention:
- said path follows said initial outline and is separated from the latter by a distance of at most 5 millimeters;
- said path is a homothetic transformation of or a constant addition to said initial outline;
- said shaping step is a roughing-out step;
- said shaping step is a finishing step, preceded by a roughing-out step, and in which step said intermediate step comes between the roughing-out step and the finishing step;

said finishing step comprises a grooving operation, a milling operation, a beveling operation and/or a chamfering operation and/or a polishing operation;

said clamping means being adapted to drive the lens to rotate by incrementing its angular position by a regular increment:

in the intermediate step, the unloaded value of said machining force is measured for each increment of the clamping means, in the shaping step, the loaded value of said machining force is measured for each increment of the clamping means, and for each increment in the shaping step, said machining tool is controlled depending on the difference between the unloaded value measured for the preceding increment and the unloaded value measured, for the corresponding increment, in the intermediate step;

in the shaping step, said machining tool is controlled, relative to said clamping means, such that the force applied by said machining tool, to the ophthalmic lens, which force is deduced from the difference between the measured loaded value and the corresponding recorded unloaded value, remains substantially equal to a preset constant;

in the shaping step, said machining tool is controlled, relative to said clamping means, in such a way that the cycle time for implementing this shaping step is equal to a preset length of time;

if said difference exceeds a preset threshold value for a set length of time, said machining tool is controlled, relative to said clamping means, depending on the difference between the measured loaded value and the corresponding recorded unloaded value, in such a way that the cycle time for implementing this shaping step exceeds said preset length of time;

if the derivative of said difference exceeds a set threshold value, said machining tool is controlled, relative to said clamping means, depending on the difference between the measured loaded value and the corresponding recorded unloaded value, in such a way that the cycle time for implementing this shaping step exceeds said preset length of time;

at the end of said shaping step, a characteristic indicator of the force applied by said machining tool to the ophthalmic lens in the shaping step is determined, this indicator depending on the difference between at least one measured loaded value and the corresponding recorded unloaded value, and provision is made for a monitoring step in which said indicator is compared with a threshold value to verify that the machining tool is in a fit state to operate;

at the end of said shaping step, a characteristic indicator of the force applied by said machining tool to the ophthalmic lens in the shaping step is stored in memory, this indicator depending on the difference between at least one measured loaded value and the corresponding recorded unloaded value, and provision is made for a monitoring step in which variation in said indicator is monitored.

The invention also relates to a device for machining an ophthalmic lens such as defined in the introduction, in which said controlling unit is adapted to implement the intermediate and shaping steps of the aforementioned shaping process.

Advantageously, the force sensor comprises either a single unidirectional strain gauge, or two unidirectional strain gauges, or one bidirectional strain gauge.

DETAILED DESCRIPTION OF AN EXAMPLE EMBODIMENT

The following description, given with regard to the appended drawings, by way of nonlimiting example, will allow what the invention consists of and how it can be carried out to be understood.

In the appended drawings:

FIG. 1 shows a device 200 for machining an ophthalmic lens 20, comprising:

Figure 1:
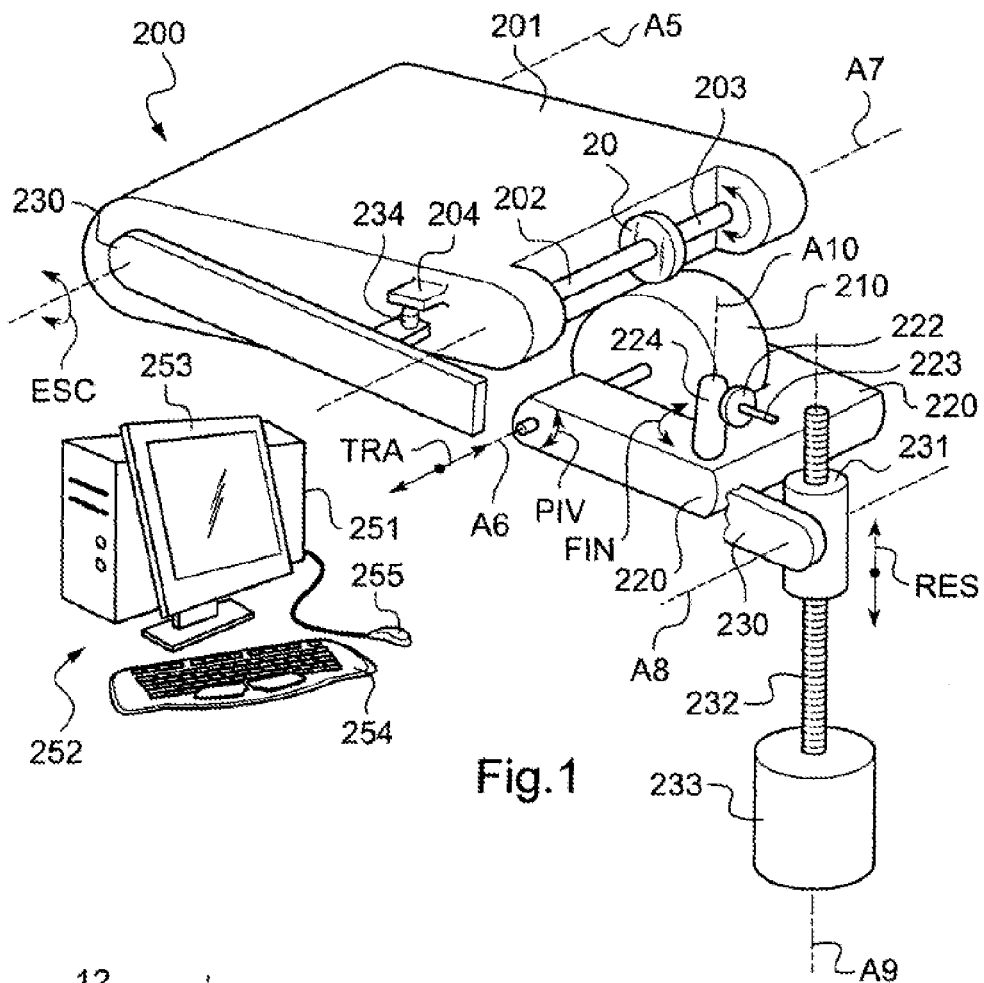
FIG. 1 is a schematic view of a machining device adapted to implement the process according to the invention.

means 202, 203 for clamping the ophthalmic lens 20;

at least one tool 210, 222, 223 for machining the ophthalmic lens 20;

a force sensor 234 adapted to measure a force related to the force applied by the machining tool 210, 222, 223 to the ophthalmic lens 20; and a unit 251 for controlling each machining tool 210, 222, 223 relative to the clamping means 202, 203.

This machining device 200 could take the form of any machine for cutting or removing material, able to modify the outline of the ophthalmic lens 20 in order to adapt it to that of the corresponding eyewire of the selected spectacle frame.

In the example schematically illustrated in FIG. 1, the machining device 200 consists, as is known per se, of an automatic grinder 200, widely referred to as a digital grinder. In this case, this grinder comprises:

a rocker 201 that is mounted so as to freely pivot about a reference axis A5, in practice a horizontal axis, on a mounting (not shown), and that supports the ophthalmic lens 20 to be machined;

at least one abrasive wheel 210 that is secured against rotation on an abrasive-wheel axis A6 parallel to the reference axis A5, and that is also duly driven to rotate by a motor (not shown);

a finishing module 220 that is fitted so as to rotate about the abrasive-wheel axis A6, and that is equipped with tools 222, 223 for finishing the ophthalmic lens 20.

The pivoting mobility of the rocker 201 about the reference axis is called retraction mobility ESC. It allows the ophthalmic lens 20 to be brought closer to the abrasive wheel 210 until the former makes contact with the latter.

This rocker 201 is equipped with two shafts 202, 203 for clamping the ophthalmic lens 20 to be machined and for driving it to rotate, which shafts 202, 203 correspond to the aforementioned "clamping means".

These two shafts 202, 203 are aligned with each other along a clamping axis A7 parallel to the axis A5. Each of the shafts 202, 203 possesses a free end that faces the other and that is equipped with a head for clamping the ophthalmic lens 20.

A first 202 of the two shafts is fixed in translation along the clamping axis A7. In contrast, the second 203 of the two shafts is mobile in translation along the blocking axis A7 in order to allow the ophthalmic lens 20 to be compressively clamped axially between the two clamping heads.

The grinder 200 schematically shown in FIG. 1 comprises only one cylinder abrasive wheel 210.

In practice, it rather comprises a bank of a number of abrasive wheels mounted coaxially on the abrasive-wheel axis A6, each abrasive wheel being used for a specific shaping operation of the ophthalmic lens 20 to be machined.

Thus, for the roughing-out of the lens, a roughing-out cylinder abrasive wheel is used.

For the beveling of the lens, which consists in machining a rib along the edge face of the lens, a shaping abrasive wheel (or "beveling abrasive wheel") is used, this abrasive wheel containing a beveling groove of dihedral cross-section.

For the polishing of the lens, a cylinder abrasive wheel and a shaping abrasive wheel, of identical geometries to the two abrasive wheels mentioned above, are used, the grain sizes of these polishing abrasive wheels being particularly small.

The bank of abrasive wheels is born by a slide (not shown) so as to move in translation along the abrasive-wheel axis A6. The translational movement of the slide bearing the abrasive wheels is called the "transfer" TRA.

It will be understood that here it is a question of producing a relative movement between the abrasive wheels and the lens and that provision could be made, as a variant, for the lens to move axially, the abrasive wheels remaining stationary.

The grinder 200 furthermore comprises a link rod 230 one end of which is hinged relative to the mounting in order to pivot about the reference axis A5, and the other end of which is hinged relative to a nut 231 in order to pivot about an axis A8 parallel to the reference axis A5.

The nut 231 is itself mounted to move in translation along a restitution axis A9 perpendicular to the reference axis A5. Such as schematically illustrated in FIG. 6, the nut 231 is a tapped nut in screwed engagement with a threaded shank 232 that, aligned with the restitution axis A9, is driven to rotate by a motor 233.

The link rod 230 moreover comprises a force sensor 234, here consisting of a unidirectional strain gauge, that interacts with a stop 204 fixed to the rocker 201.

When, duly clamped between the two shafts 202, 203, the ophthalmic lens 20 to be machined is brought into contact with one of the abrasive wheels 210, it is the object of an effective removal of material until the stop 204 of the rocker 201 buts against the link rod 230 with a force that, acting on the strain gauge 234, is duly detected and measured by the latter.

Here, the strain gauge 234 is placed so as to measure a machining force of substantially vertical direction, corresponding to the radial component of the force exerted, by the ophthalmic lens 20, on the abrasive wheel 210 or finishing tool 222, 223 used.

To machine the ophthalmic lens 20 following a given outline, it is therefore enough, on the one hand, to appropriately move the nut 231 along the restitution axis A9, under the control of the motor 233, in order to control the restitution movement RES, and on the other hand, to make the supporting shafts 202, 203 pivot together about the clamping axis A7. The restitution movement (and therefore the retraction movement of the rocker 201) and the rotational movement of the shafts 202, 203 are controlled and coordinated by a controlling unit 251, duly programmed for this purpose, so that all the points of the outline of the ophthalmic lens 20 are, in succession, brought to the correct diameter.

According to the invention, the retraction movement is in particular controlled depending on the machining force measured by the strain gauge 234, so as to prevent this force from exceeding a threshold above which the lens 20 could run the risk of slipping from between the shafts 202, 203, or above which the tool used could run the risk of being damaged.

As for the finishing module 220, it has a pivoting mobility about the abrasive-wheel axis A6, which mobility is denoted PIV. In fact, the finishing module 220 is provided with a toothed cog (not shown) that meshes with a pinion with which the shaft of an electric motor securely fastened to the slide bearing the abrasive wheels is equipped. This mobility allows it to be brought closer to or moved further away from the ophthalmic lens 20.

The finishing tools 222, 223 with which the finishing module 220 is equipped here especially comprise a grooving disk 222 adapted to produce a groove along the edge face of the ophthalmic lens 20, and a milling cutter 223 adapted to chamfer the sharp edges of the ophthalmic lens 20.

These finishing tools 222, 223 are mounted to rotate about a given axis and are driven to rotate by a motor housed in a base 224 that is itself mounted to pivot on the finishing module 220 about an axis A10 orthogonal to the abrasive-wheel axis A6. This pivoting mobility of the base 224 about the axis A10, called the finishing mobility FIN, allows the tools 222, 223 to be best oriented relative to the lens.

The controlling unit 251 is an electronic and/or computing unit and it in particular allows the following to be controlled:
- the motor for driving the second shaft 203 to move in translation;
- the motor for driving the two shafts 202, 203 to rotate;
- the motor for driving the slide bearing the abrasive wheels to move in translation with its transfer mobility TRA;
- the motor 233 for driving the nut 231 to move in translation with its restitution mobility RES;
- the motor for driving the finishing module 220 to rotate with its pivoting mobility PIV; and
- the motor for driving the base 224 of the finishing tools 222, 223 to rotate with its finishing mobility FIN.

Lastly, the grinder 200 comprises a human-machine interface 252 that here comprises a display screen 253, a keyboard 254 and a mouse 255, which are adapted to communicate with the controlling unit 251. This HMI interface 252 allows the user to enter numerical values, such as the material of the lens, on the display screen 253, so that the tools of the grinder 200 can be appropriately controlled.

In FIG. 1, the controlling unit is implemented on a desktop computer connected to the grinder 200. Of course, as a variant, the software portion of the grinder could be implemented directly on an electronic circuit of the grinder. It could also be implemented on a remote computer, communicating with the grinder via a private or public network, for example using an IP (Internet) communication protocol.

The spectacle frame intended to receive the ophthalmic lens 20 will, in the rest of the description, be considered to be a full-rimmed frame, i.e. one that comprises two eyewires connected to each other by a bridge, each of these eyewires having an internal groove called a "bezel" into which the lens can be fitted.

Figure 2:
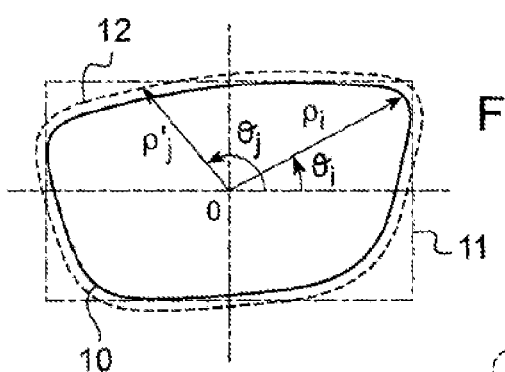
FIG. 2 illustrates the outline (solid line) of an eyewire of a spectacle frame, the box (dash-dotted line) for this outline, and an intermediate outline (dashed line) obtained by a homothetic transformation.

FIG. 2 shows (solid line) a projection of the outline 10 of the bottom of the bezel of this eyewire.

FIG. 2 also shows (dash-dotted line) the "boxing system" (named box 11) of this outline 10.

Specifically, it will be recalled that the box 11 is a rectangle that is drawn around the projection of the outline 10, and two sides of which lie parallel to the horizontal.

The centre O of this box 11 then forms the origin of a polar coordinate system $\rho$, $\theta$.

Before the ophthalmic lens 20 is shaped, the controlling unit 251 acquires the geometry of the outline 10.

This acquired outline 10 will possibly, for example, take the form of a set of triplets ($\rho_i$, $\theta_i$, $z_i$) corresponding to the cylindrical coordinates of a plurality of points characterizing the shape of this outline 10.

Preferably, these triplets will be acquired from a collection of databases to which the optician has access. This collection of databases, which is regularly updated by the spectacle frame manufacturer or the ophthalmic lens manufacturer or even by the optician themselves, will, for this purpose, contain a plurality of records each associated with a spectacle frame model. Thus, each record will comprise an identifier identifying the model of the spectacle frame with which it is associated, and a set of 360 triplets characterizing the shape of the bottom of the bezel of each eyewire of this spectacle frame model.

As a variant, the outline 10 will possibly be acquired using an imaging device comprising image-capturing means and image-processing means. By virtue of this imaging device, the two-dimensional coordinates of points characterizing the shape of the outline 10 will possibly be acquired by taking a photo of a sample lens delivered with the spectacle frame, then by processing this photo so as to pinpoint, on this photo, 360 points located on its edge face.

Of course, the triplets ($\rho_i$, $\theta_i$, $z_i$) of the 360 points characterizing the shape of the outline 10 will possibly also be acquired in other ways, for example by contact profilometry of the bottom of the bezel of each eyewire.

The lens is then subjected to a centering operation followed by a clamping operation. These two operations are well known to those skilled in the art and do not form part of the subject matter of the present invention, hence they are only briefly described.

During the centering operation, the positions of markers marked or etched on the lens are determined, and the position required for the lens outline 10 (so that once the lens has been shaped following this outline and fitted into the selected frame its optical centre is correctly located relative to the corresponding eye of the spectacle wearer) is deduced therefrom.

During the clamping operation, a gripping accessory is adhesively bonded to the lens in a position centered on the centre O of the box 11, then, by virtue of this gripping accessory, the lens is clamped between the shafts 202, 203 of the machining apparatus 200 such that the centre O is located centered on the clamping axis A7.

The shaping is then carried out in two operations, namely a roughing-out operation and a finishing operation.

For the roughing-out of the lens, the cylinder abrasive wheel is used to coarsely decrease the radii of the lens to a shape close to the shape of the outline 10. More precisely, the cylinder abrasive wheel and the rocker 201 are here controlled relative to each other so as to decrease, for each angular position $\theta_i$ of the lens about the clamping axis A7, the radius of the lens to a length equal to the radius $\rho_i$ of the outline 10.

To finish the lens, the shaping abrasive wheel is used to form, on the edge face of the lens, a fitting rib, or "bevel", the tip of which extends lengthwise along a path of similar shape to that of the outline 10. More precisely, the cylinder abrasive wheel and the rocker 201 are here controlled relative to each other so as to decrease, for each angular position $\theta_i$ of the lens about the clamping axis A7, the radius of the tip of the bevel of the lens to a length equal to $\rho_i$-$k_1$, where $k_1$ is a preset constant taking account of the fact that the tip of the bevel does not make contact with the bottom of the bezel, but remains a distance away from the latter.

It will be noted that, during this finishing operation, the ophthalmic lens 20 follows, relative to the abrasive-wheel axis A6, a path deduced from the shape of the contour 10.

Of course, if the lens were intended to be fitted in a half-rimmed spectacle frame, the grooving disk 222 would be used to finish the lens. The base 224, the finishing module 220 and the rocker 201 would then, more precisely, be controlled relative to one another in order to form, for each angular position $\theta_i$ of the lens about the clamping axis A7, a groove recessed in the edge face of the lens, the bottom of this groove being separated from the clamping axis A7 by a distance equal to $\rho_i$-$k_2$, where $k_2$ is a preset constant depending on the desired depth of this groove.

According to the invention, an intermediate operation is implemented between the clamping operation and one of the shaping operations, and, more particularly here, between the roughing-out operation and the finishing operation.

Overall, this intermediate operation consists in making the various members of the grinder 200 follow a path very close to the one that they follow when they machine the ophthalmic lens 20 during the finishing operation, but unloaded, i.e. without the lens touching one of the tools, so as to measure the unloaded value of the forces required to move these members through open space, on account of the frictional and inertial forces at work.

More precisely, the intermediate operation consists, on one hand, in controlling the rotation of the shafts 202, 203, the retraction ESC of the rocker 201 and the transfer TRA of the bank of abrasive wheels 210 in such a way that the lens makes a complete revolution about itself following a path such that its edge face remains a small distance away from the selected tool, and on the other hand, in noting, and storing in memory, the unloaded value of the machining force measured by the strain gauge 234 for each angular position $\theta_i$ of the lens about the clamping axis A7.

In this way, during the finishing operation, it is possible to control these members, and especially the retraction ESC of the rocker 201, in light of the force actually exerted by the ophthalmic lens 20 on the tool (which corresponds to the measured value of the machining force minus the unloaded value measured beforehand).

There follows a detailed description of the implementation of this intermediate operation.

The controlling unit 251 starts by calculating the path that the ophthalmic lens 20 must follow relative to the shaping abrasive wheel, so that its edge face remains a small distance away from the latter.

As was described above, at this stage of the shaping process, the edge face of the lens is located, for each angular position $\theta_i$ of the lens, at a distance $\rho_i$ from the clamping axis A7.

Next, it is desired to control the members of the grinder 200 in such a way that the shaping abrasive wheel passes, for each angular position $\theta_i$ of the lens, at a distance $p'_i$ from the clamping axis A7 that is strictly larger than the distance $\rho_i$.

As FIG. 2 shows, the doublets ($\rho'_i$, $\theta_i$) then define an intermediate outline 12 that is larger than the outline 10, which outline 12 corresponds to the path that the working surface of the shaping abrasive wheel will follow relative to the edge face of the ophthalmic lens 20.

In the present case, the distances $p'_i$ are chosen in such a way that the intermediate outline 12 is at every point separated from the outline 10 by a non-zero distance that is smaller than 5 millimeters.

More precisely, here these distances are calculated using the following relationship:

$p'_i = h \cdot \rho_i$, where h is a preset constant, here equal to 1.1.

The intermediate outline 12 is thus a homothetic transformation of the outline 10, of centre O and of ratio h.

Figure 3:
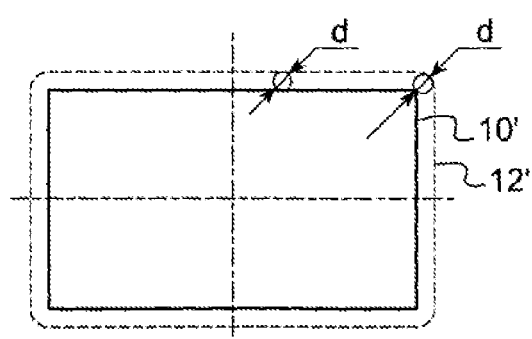
FIG. 3 illustrates the outline (solid line) of an eyewire of a spectacle frame, and an intermediate outline (dashed line) obtained by a constant addition.

As a variant, these distances $p'_i$ could of course be calculated differently. By way of example, such as shown in FIG. 3, the intermediate outline 12' could be calculated by a constant addition to the outline 10', such that the separation d between these two outlines remains constant.

In any case, the retraction ESC of the rocker 201, the rotation of the shafts 202, 203 and the transfer TRA of the bank of abrasive wheels 210 are then controlled such that, for each angular position $\theta_i$ of the lens about the clamping axis A7, the shaping abrasive wheel is located a distance $p'_i$ from the clamping axis A7.

The unloaded value $F_{0i}$ of the machining force measured by the strain gauge 234 is then noted for each angular position $\theta_i$ of the lens, then stored in memory in an ad hoc database of the controlling unit 251.

Then, in the finishing step, the loaded value $F_{1i}$ of the machining force is measured for each angular position $\theta_i$ of the lens, and the retraction ESC of the rocker 201 is controlled depending on the difference $\Delta F_i$ between the loaded value $F_{1\ i-1}$ measured just beforehand and the unloaded value $F_{0i}$ measured during the intermediate step.

It will be understood here that this difference $\Delta F_i$ corresponds, to within a factor, to the force actually exerted, by the lens, on the shaping abrasive wheel.

In a first implementation of the finishing of the lens, the rocker 201 is controlled using force.

In this mode, the retraction ESC of the rocker 201 is more precisely controlled so that this difference $\Delta F_i$ remains constantly equal to a preset threshold, defined as the threshold above which the ophthalmic lens 20 could run the risk of slipping from between the shafts 202, 203, or above which the shaping abrasive wheel or the lens could be damaged.

In this way, the lens is beveled with optimal rapidity.

During this operation, considering the length of time taken to bevel the lens, it is possible to deduce therefrom an approximation of the wear of the shaping abrasive wheel.

Then, beyond a preset degree of wear, the controlling unit may be programmed to alert the user via the screen 253, by displaying an alarm message.

During this operation, considering the machining speed of the lens, it is also possible to detect a fault or a problem during the machining of a lens, such as, for example, an error in the entry by the user of the material of the lens to be shaped.

Then, here again, the controlling unit may be programmed to alert the user via the screen 253, by displaying an alarm message. Provision may especially be made to look for the cause of this fault or problem, and to display it in order to make the work of the optician easier.

During a last operation, called a fine-finishing operation, the ophthalmic lens 20 is polished using the polishing abrasive wheel, and chamfered using the milling cutter 223.

During this operation, in the same way as in the preceding operation, the loaded value $F_{2i}$ of the machining force is measured for each angular position $\theta_i$ of the lens, so that the retraction ESC of the rocker 201 can be controlled depending on the force actually exerted, by the lens, on the polishing abrasive wheel or on the milling cutter (this force being deduced from the difference $\Delta F'_i$ between the loaded value $F_{2\ i-1}$ measured just beforehand and the unloaded value $F_{0i}$ measured during the intermediate step).

For the polishing, the retraction ESC of the rocker 201 is more precisely controlled so that this difference $\Delta F'_i$ is particularly small, thereby ensuring a smooth polish of the edge face of the lens. It will be understood here that this smooth polish is made possible by the precision with which the force actually exerted, by the lens, on the polishing abrasive wheel, is determined.

Once shaped, chamfered and polished, the ophthalmic lens is lastly extracted from the grinder 200 using the translational mobility of the second shaft 203, and then is fitted into the corresponding eyewire of the selected spectacle frame.

In a second embodiment of the finishing step of the lens, the various members of the grinder are controlled using speed so that the cycle time is equal to a preset length of time $\Delta T$.

Thus, from one lens to another, the grinder always takes the same amount of time to finish the lens, in particular whatever the wear of the shaping abrasive wheel.

According to the invention, provision is made for two exceptions to this invariable mode of controlling the lenses.

The first exception consists, if the difference $\Delta F_i$ exceeds a preset threshold value for a preset length of time (thereby indicating, for example, that the shaping abrasive wheel is worn), in no longer controlling the grinder using speed but using force, so as to bring this difference $\Delta F_i$ to the preset threshold value. Thus, it will be understood that, this being the case, the cycle time for implementing this finishing step then exceeds said preset length of time $\Delta T$.

The second exception consists, if the derivative with respect to time of the difference $\Delta F_i$ exceeds a preset threshold value (thereby indicating that the machining force has abruptly varied following some sort of problem), in decreasing the machining velocity of the lens. It will be understood here that the cycle time for implementing this finishing step then also exceeds said preset length of time $\Delta T$.

In this embodiment of the invention, provision may also be made, after the step of finishing each lens, to determine a characteristic indicator of the force that was applied, by the abrasive wheel, to the lens, throughout the finishing of this lens.

Provision may, for example, be made to store in memory the maximum value reached by this force, by recording the maximum difference $\Delta F_i$ noted during the finishing step. As a variant, an average of this force could also be recorded.

Next, in a monitoring step, this indicator may be compared with a preset threshold value.

Thus, when this indicator exceeds the threshold value, the controlling unit will be programmed to alert the user via the screen 253 that the wear of their shaping abrasive wheel is advanced and that it is necessary if not to change it, at least to refrain from machining lenses that are made from particularly hard materials.

In this monitoring step, the controlling unit will possibly also monitor the variation of said indicator, so as in particular to verify whether this variation is regular. Provision will then possibly be made, if this variation is irregular, to alert the user by displaying an alarm message on the screen 253, in order to notify them of the presence of a problem.

The controlling unit will possibly also, depending on this variation, calculate the remaining lifetime of the shaping abrasive wheel and display, on the screen, the number of cycles that the shaping abrasive wheel is still liable to be able to carry out before needing to be changed.

Provision may of course be made for this number of remaining cycles either to be sent directly to a technician, so that the user no longer has to call the technician, the latter instead coming to replace the shaping abrasive wheel themselves when it is worn.

Provision may also be made for the controlling unit to recalibrate, depending on this variation, the positions of its various members, in order to take the wear of the shaping abrasive wheel into account.

The present invention is in no way limited to the embodiments described and shown, and those skilled in the art will be able to make modifications thereto without departing from the scope of the invention.

In particular, provision may be made to replace the strain gauge with an ammeter that, by measuring the magnitude of the current supplied to the motor actuating the shafts 202, 203, would allow the machining forced to be determined.

The unidirectional strain gauge could also be replaced by a bidirectional strain gauge (or by two unidirectional strain gauges) in order to measure not only the radial component of the machining force exerted, by the lens, on the tools, but also the tangential component of this force.

Moreover, provision could also be made to implement the intermediate operation before the roughing-out operation of the lens, when the latter still has a circular outline.

The advantage of this variant is that it is possible to minimize the duration of the roughing-out operation, by controlling the rocker in such a way that the lens exerts, on the roughing-out abrasive wheel, a force close to the permitted threshold.

However, its disadvantage is that the unloaded value of the machining force is measured by controlling the members of the grinder along a path far removed from the outline 10, to the point that this unloaded value is not precisely representative of the frictional and inertial forces that actually act on the members of the grinder during the finishing and fine-finishing operations. To obviate these drawbacks, it would of course be possible to reiterate the intermediate step a second time, between the roughing-out and finishing operations, the members of the grinder this time being controlled along a path close to the outline 10.

It would also be possible to carry out the roughing-out of the lens in a number of passes, reiterating the intermediate step for each pass.

As another variant, provision could be made to trim a lens (n+1) depending on the unloaded values of the force measured in open space before shaping a preceding lens (n).

In particular, when the two lenses to be shaped one after the other are identical, it is possible to apply the same shaping setpoints to them both.

The invention claimed is:

1. A process for shaping an ophthalmic lens using a machining device equipped with clamping means for clamping the ophthalmic lens, a machining tool for machining the ophthalmic lens and a force sensor adapted to measure a force that is related to the force applied by the machining tool to the ophthalmic lens, comprising:
   a step of clamping the ophthalmic lens in said clamping means; and
   a step of shaping the ophthalmic lens using said machining tool, in which step the loaded value of said force is measured and said machining tool is controlled, relative to said clamping means, depending on the measured loaded value, so as to bring the initial outline of the ophthalmic lens to a final outline of different shape,
   wherein said process comprises, between said clamping step and said shaping step, at least one intermediate step in which said machining tool is controlled, relative to said clamping means, so as to travel the circumference of said ophthalmic lens, without contact, following a path deduced from said initial outline, and in which the unloaded value of said force measured by the force sensor is recorded, which value is related to the forces required to move said machining tool in free space relative to said clamping means, considering the frictional and inertial forces at work; and
   wherein, in the shaping step, said machining tool is controlled depending on the recorded unloaded value.

2. The shaping process as claimed in claim 1, in which said path follows said initial outline and is separated from the latter by a distance of at most 5 millimeters.

3. The shaping process as claimed in claim 1, in which said path describes an intermediate outline that is deduced from said initial outline by a homothetic transformation or a constant addition.

4. The shaping process as claimed in claim 1, in which said shaping step is a roughing-out step.

5. The shaping process as claimed in claim 1, in which said shaping step is a finishing step, preceded by a roughing-out step, and in which said intermediate step comes between the roughing-out step and the finishing step.

6. The shaping process as claimed in claim 1, in which said finishing step comprises a grooving operation or a beveling operation or a milling operation and/or a chamfering operation and/or a polishing operation.

7. The shaping process as claimed in claim 1, in which, said clamping means being adapted to drive the ophthalmic lens to rotate by incrementing its angular position by a regular increment:
   in the intermediate step, the unloaded value of said force is recorded for each increment of the clamping means;
   in the shaping step, the loaded value of said force is measured for each increment of the clamping means; and
   for each increment in the shaping step, said machining tool is controlled depending on the difference between the loaded value measured for the preceding increment and the unloaded value recorded for the corresponding increment in the intermediate step.

8. The shaping process as claimed in claim 1, in which, in the shaping step, said machining tool is controlled, relative to said clamping means, such that the force applied by said machining tool, to the ophthalmic lens, which force is deduced from the difference between the measured loaded value and the corresponding recorded unloaded value, remains substantially equal to a preset constant.

9. The shaping process as claimed in claim 1, in which, in the shaping step, said machining tool is controlled, relative to said clamping means, in such a way that the cycle time for implementing this shaping step is equal to a preset length of time.

10. The shaping process as claimed in claim 9, in which, if said difference exceeds a preset threshold value for a set length of time, said machining tool is controlled, relative to said clamping means, depending on the difference between the measured loaded value and the corresponding recorded unloaded value, in such a way that the cycle time for implementing this shaping step exceeds said preset length of time.

11. The shaping process as claimed in claim 9, in which, if the derivative of said difference exceeds a set threshold value, said machining tool is controlled, relative to said clamping means, depending on the difference between the measured loaded value and the corresponding recorded unloaded value, in such a way that the cycle time for implementing this shaping step exceeds said preset length of time.

12. The shaping process as claimed in claim 9, in which, at the end of said shaping step, a characteristic indicator of the force applied by said machining tool to the ophthalmic lens in the shaping step is determined, this indicator depending on the difference between at least one measured loaded value and the corresponding recorded unloaded value, and in which provision is made for a monitoring step in which said indicator is compared with a threshold value to verify that the machining tool is in a fit state to operate.

13. The shaping process as claimed in claim 9, in which, at the end of said shaping step, a characteristic indicator of the force applied by said machining tool to the ophthalmic lens in the shaping step is stored in memory, this indicator depending on the difference between at least one measured loaded value and the corresponding recorded unloaded value, and in which provision is made for a monitoring step in which variation in said indicator is monitored.

14. A device for machining an ophthalmic lens, comprising:
   clamping means for clamping the ophthalmic lens;
   a machining tool for machining the ophthalmic lens;
   a force sensor adapted to measure a force related to the force applied by the machining tool to the ophthalmic lens; and
   a unit for controlling said machining tool relative to said clamping means,
   characterized in that said controlling unit is adapted to implement the intermediate and shaping steps of a shaping process as claimed in claim 1.

15. The machining device as claimed in claim 14, in which said force sensor comprises at least one unidirectional strain gauge or one bidirectional strain gauge.

* * * * *